US006850044B2

(12) United States Patent
Hansen et al.

(10) Patent No.: US 6,850,044 B2
(45) Date of Patent: Feb. 1, 2005

(54) HYBRID REGULATOR WITH SWITCHING AND LINEAR SECTIONS

(75) Inventors: Jason Hansen, Scottsdale, AZ (US); Christophe Basso, Pibrac (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 10/387,206

(22) Filed: Mar. 13, 2003

(65) Prior Publication Data

US 2004/0178776 A1 Sep. 16, 2004

(51) Int. Cl.[7] .................................................. G05F 1/40
(52) U.S. Cl. ...................................... 323/266; 323/268
(58) Field of Search ................................ 323/266, 268, 323/265

(56) References Cited

U.S. PATENT DOCUMENTS

| 4,803,612 | A |   | 2/1989  | Skovmand          |
|-----------|---|---|---------|-------------------|
| 5,216,351 | A | * | 6/1993  | Shimoda ... 323/224 |
| 5,414,340 | A | * | 5/1995  | Gannon ... 323/266 |
| 5,592,072 | A | * | 1/1997  | Brown ... 323/268  |
| 5,617,016 | A |   | 4/1997  | Borghi et al.     |
| 6,667,602 | B2| * | 12/2003 | Cook ... 323/268  |

* cited by examiner

*Primary Examiner*—Shawn Riley
(74) *Attorney, Agent, or Firm*—Robert F. Hightower

(57) ABSTRACT

A power supply system includes a non-linear section that provides an intermediate voltage. A linear section receives the intermediate voltage and generates the output voltage. The linear section forms a control signal that is used by the non-linear section to change the value of the intermediate voltage as the output voltage changes to keep the differential voltage across the linear section low.

17 Claims, 7 Drawing Sheets

HYBRID REGULATOR WITH SWITCHING AND LINEAR SECTIONS

BACKGROUND OF THE INVENTION

The present invention relates, in general, to electronics, and more particularly, to methods of forming power supply systems and structures.

In the past, the electronics industry utilized various implementations of power supply systems to provide power to a load. Typically these implementations were classified either as linear power supply systems or non-linear power supply systems. Linear systems typically utilized an error amplifier to sense an output voltage and control a pass transistor to achieve a desired output voltage. One example of a linear system is disclosed in U.S. Pat. No. 4,803,612 issued to Timothy J. Skovmand on Feb. 7, 1998, which is hereby incorporated herein by reference. Such linear systems generally provide a faster response to changes in the load voltage and have very low output noise. However, such linear systems typically were not very efficient. Non-linear systems typically include a switching control element that periodically enables and disables a pass transistor to provide power to the load, sometimes referred to as varying the duty cycle of the pass transistor. One example of such a non-linear regulator is disclosed in U.S. Pat. No. 5,617,016 issued to Maria R. Borgi et al on Apr. 1, 1997, which is hereby incorporated herein by reference. Such non-linear regulators were more efficient than linear regulators but provided a much slower response time to changes in the load voltage.

In some applications such as battery operated applications and particularly for cell-phone applications, it is important to have efficient operation and fast response time in order to provide maximum battery life. Accordingly it is desirable to have a power supply control system that has efficient operation and a fast response time.

For simplicity and clarity of illustration, elements in the figures are not necessarily to scale, and the same reference numbers in different figures denote the same elements. Additionally, descriptions and details of well known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
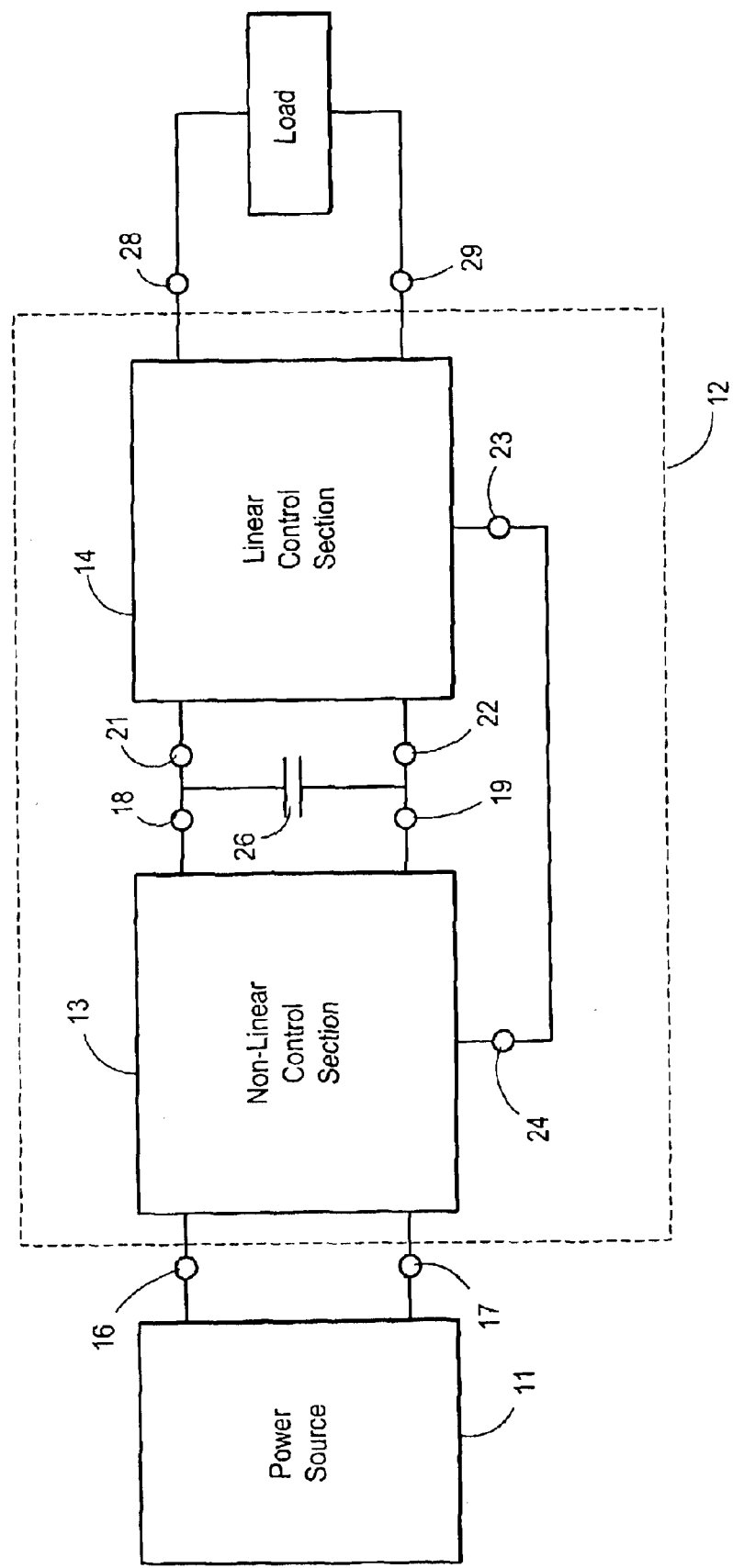
FIG. 1 schematically illustrates an embodiment of a portion of a power supply system in accordance with the present invention.

FIG. 1 schematically illustrates an embodiment of a power supply system 10 that is formed to provide efficient operation and rapid response to changes in the load voltage and to changes in the load current. System 10 may also be formed to provide such responses to changes in a reference voltage. System 10 includes a power source 11 that provides power to a power controller 12, generally illustrated by a dashed box. Power source 11 may be any of various well-known power sources including a rectified voltage from an AC source. System 10 may be utilized in a variety of applications including personal data devices, portable computers, and the like. In the preferred embodiment, system 10 is a portion of a cell-phone and power source 11 is a battery of the cell-phone. Power supply system 10 is formed to have a non-linear control section 13 that receives an input voltage from power source 11 and provides an intermediate output voltage or intermediate voltage between a non-linear section output 18 and a non-linear section return 19. Non-linear control section 13 may be formed as any one of several types of functional blocks that are commonly referred to as operating in a non-linear mode including a switching power supply controller, pulse width modulated (PWM) controller, buck converter, boost converter, or a charge pump converter. Power supply system 10 is also formed to have a linear control section 14 that is cooperatively coupled to receive the intermediate voltage from non-linear control section 13 and to responsively provide a control signal to facilitate non-linear control section 13 changing the value of the intermediate voltage. Linear control section 14 may be formed as any one of several types of functional blocks that are commonly referred to as operating in a linear mode including those referred to as low drop-out voltage regulators. In one embodiment, section 13 responsively changes the intermediate voltage responsively to changes in a value of a reference voltage of section 14. In another embodiment, section 13 changes the intermediate voltage responsively to changes in a value of a power supply output voltage or output voltage, or responsively to changes in an output current. The output voltage is formed between a power supply output 28 and a power supply return 29 of linear control section 14. Linear control section 14 provides the control signal on a linear control output 23 that is coupled to a non-linear section control input 24 of section 13. A capacitor 26 typically is connected in series between non-linear section output 18 and non-linear section return 19 in order to filter rapid changes in the value of the intermediate voltage.

Figure 2:
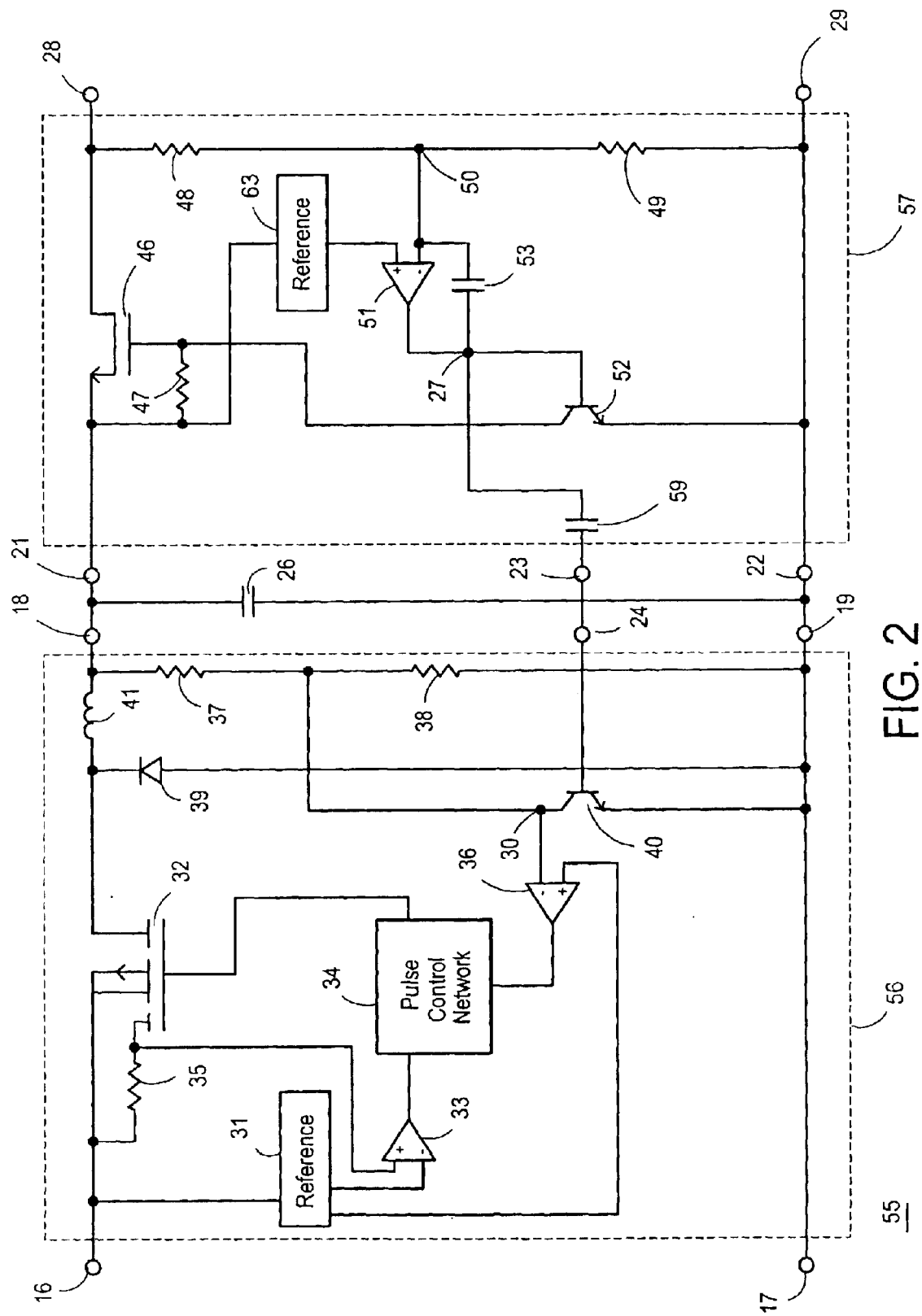
FIG. 2 schematically illustrates an embodiment of a portion of a power supply controller in accordance with the present invention.

FIG. 2 schematically illustrates an embodiment of a portion of a power controller 55 that is an embodiment of controller 12 described in the description of FIG. 1. Controller 55 includes a non-linear control section 56 that is an embodiment of non-linear control section 13, and a linear control section 57 that is an embodiment of linear control section 14 both of which were explained in the description of FIG. 1. Coupling section 57 to receive the intermediate voltage and responsively changes the intermediate voltage to changes in the value of the output voltage provides the rapid response and accuracy of a linear section combined with the efficiency of a non-linear section. Linear control section 57 is formed to include a linear pass transistor 46 that receives the intermediate voltage and generates the output voltage on output 28. Transistor 46 is suitable for conducting the large current flows required by loads coupled to output 28 and may be a bipolar transistor, a field effect transistor (FET), or other equivalent device. In the preferred embodiment, transistor 46 is a metal oxide semiconductor (MOS) FET. A resistor 47 provides a voltage pull-up for the gate of transistor 46 and cooperates with a transistor 52 to control the amount of power supplied by transistor 46. A linear section error amplifier 51 is formed to generate an error signal on an output of amplifier 51. To facilitate generating the error signal, amplifier 51 is formed to receive a linear sense voltage that is formed on a linear sense node 50, and to compare the linear sense voltage to a linear reference voltage received from a linear voltage reference or first voltage reference 63. The value of the linear sense voltage represents the value of the output voltage, thus, changes in the value of the output voltage are reflected as changes in the value of the linear sense voltage. In the preferred embodiment, a resistor divider is formed to generate the linear sense voltage from the output voltage. The resistor divider comprises a first linear sense resistor 48 connected in series with a second linear sense resistor 49 between output 28 and return 29. If the output voltage changes, the linear sense voltage correspondingly changes thereby causing a corresponding change in the error signal output of amplifier 51. An integrating capacitor 53 integrates the error signal to prevent undesirable changes from noise and other nondesirable sources. Capacitor 53, amplifier 51, and resistors 48 and 49 form a simplified feedback loop. Those skilled in the art recognize that the feedback loop may have various implementations without changing the scope of the invention. The error signal is used to drive transistor 46 in order to compensate for changes in the output voltage. In the preferred embodiment, the output of amplifier 51 drives transistor 52 which amplifies the error signal in order to provide sufficient drive capability for transistor 46. A coupling capacitor 59 is formed to receive the error signal and facilitate section 57 forming the control signal on output 23. The control signal facilitates changing the intermediate voltage in response to changes in the power supply output voltage, as will be seen in more detail hereinafter.

Non-linear control section 56 includes a non-linear section pass transistor or NL pass transistor 32 that receives the input voltage and generates the intermediate voltage on output 18. A non-linear section sense voltage or NL sense voltage that represents the value of the intermediate voltage is formed on a non-linear section sense node or NL sense node 30. In the preferred embodiment, a resistor divider is formed to provide the NL sense voltage. The resistor divider comprises a first non-linear section sense resistor 37 connected in series with a second non-linear section sense resistor 38 between output 18 and return 19. A non-linear section reference or NL reference or second reference 31 is formed to generate a non-linear section reference voltage or NL reference voltage on a reference voltage output or first output of reference 31. The NL reference voltage facilitates maintaining the intermediate voltage at a fixed value. A non-linear section error amplifier or NL error amplifier 36 is formed to receive the NL sense voltage, compare it to a value of the NL reference voltage, and generate a non-linear section error signal or NL error signal that is used to increase or decrease the value of the intermediate voltage in order to achieve the fixed intermediate voltage value. Amplifier 36 and resistors 37 and 38 form a simplified feedback network. As will be understood by those skilled in the art, the feedback network may have various implementations as long as it provides the NL sense voltage. The NL error signal is received by a pulse control network 34. Network 34 may be formed as any one of a variety of pulse control schemes including pulse width modulation (PWM), pulse frequency modulation (PFM), one-shot controller, or other schemes that provide switching or pulsed control of transistor 32. Network 34 provides a drive signal to transistor 32. Network 34 changes a duty cycle of the drive signal in response to changes in the value of the intermediate voltage. Network 34 increases the duty cycle in response to decreases in the value of the intermediate voltage and reduces the duty cycle in response to increases in the value of the intermediate voltage. Those skilled in the art will recognize that network 34 typically includes an oscillator and other control logic to form pulses that periodically drive transistor 32. Such networks are well known to those skilled in the art. One example of such a network is disclosed in U.S. Pat. No. 5,617,016 which was incorporated by reference hereinbefore.

Transistor 32 typically is connected to output 18 through an inductor 41 that filters high-frequency signals from the voltage applied to output 18. Transistor 32 is formed to provide the load current required by the loads connected to output 28. Transistor 32 may be an MOS transistor, a bipolar transistor, or other equivalent device. A diode 39 typically is connected between inductor 41 and return 17 in order to dissipate the energy stored within inductor 41 after transistor 32 turns-off. Diode 39 may be implemented as a diode or as a diode connected transistor. In some embodiments, any or all of transistor 32, diode 39, or inductor 41 may be external to section 56. In the preferred embodiment, transistor 32 is formed as a sensing transistor that provides a current sense output representing the value of the current flowing through transistor 32. Such transistors are often referred to as sense FETs. Such sensing transistors are well known to those skilled in the art. The current sense output of transistor 32 is provided to a positive input of a current sensing amplifier 33. A resistor 35 changes the output current of transistor 32 to a voltage that is used for protecting transistor 32. Reference 31 also forms a protection reference voltage on a protection output or second output of reference 31 that is connected to an inverting input of amplifier 33. Amplifier 33 is formed to generate a current control signal on the output of amplifier 33. The current control signal is connected to a current control input of network 34. Network 34 utilizes the current control signal to assist in preventing over current conditions through transistor 32. Such current sensing and over-current protection are well known to those skilled in the art. The skilled artisan also recognizes that reference 31 and the current sensing of transistor 32 are optional and that in other embodiments such sensing and protection may be omitted or formed in other alternate well known embodiments. Other well known functions and circuits such as soft start, under voltage lock-out, over voltage protection, thermal protection, current mode control, or voltage mode control may also be included as a portion of section 56.

In order for section 57 to have as high efficiency as possible, the voltage drop from input 21 to output 28 should be as low as possible. However, in order to have a good power supply noise rejection, (PSRR), it is desirable to maintain a medium to high voltage drop across transistor 46. When the output voltage varies, it is remains desirable to maintain the medium to high voltage drop across transistor 46 in order to maintain a good PSRR. One skilled in the art will realize that it is difficult to turn-on a pass transistor to provide more current and at the same time have a sufficient voltage drop to ensure a good PSRR. As will be seen hereinafter, controller 55 is formed to change the intermediate voltage in response to a change in the output voltage thereby facilitating maintaining a medium to high voltage drop across transistor 46, in order to maintain a good PSRR, and still adjust the value of the output voltage back to the desired value. Typically, transistor 46 has a voltage drop that is less than 0.5 volts and preferably is no greater than about 0.3 volts. A coupling transistor 40 is formed to facilitate non-linear control section 56 rapidly responding to changes in the value of the output voltage on output 28. Transistor 40 is formed to receive the value of the control signal on control input 24 and responsively change the value of the intermediate voltage by changing the value of the NL sense voltage on node 30. As the value of the power supply output voltage on output 28 changes, the linear sense voltage on node 50 correspondingly changes thereby causing a corresponding change in the value of the linear error signal. The change in the linear error signal value changes the drive to transistor 46 which begins to change the output voltage in an opposite direction toward the desired value. The change in the linear error signal also is connected to coupling capacitor 59. If the output voltage change increases the linear error signal, for example the output voltage decreases, a positive going current flow or current spike is generated through capacitor 59 resulting in a positive current applied to the control electrode of transistor 40. The current flow or spike results from changing the voltage across the capacitor. The duration and magnitude are dependent upon the magnitude of the change in the output voltage. This positive current enables transistor 40 to begin conducting current. Turning-on transistor 40 provides additional current flow through resistor 37 thereby increasing the voltage dropped across resistor 37 and reducing the value of the NL sense voltage at node 30. The reduced sense voltage causes an increase in the value of the output of amplifier 36. This increased voltage is received by network 34 which increases the duty cycle of the drive to transistor 32 causing an increase in the intermediate voltage on output 18. Section 56 rapidly responds to the reduced value of the sense voltage and rapidly increases the value of the intermediate voltage allowing the output of section 57 to change rapidly. Typically the intermediate voltage increases at a rate at least equal to the rate of change of the output voltage and may change up to twice as fast as the rate of change of the output voltage. Increasing the intermediate voltage provides additional input voltage or headroom when section 57 needs to change the value of the output voltage. This allows controller 55 to maintain a good PSRR. Typically the PSRR is maintained at approximately fifty dB to ninety dB, and preferably is about seventy dB. As the value of the voltage on input 24 decreases below the threshold voltage of transistor 40, transistor 40 ceases conducting and allows the NL sense voltage to return to the value that is representative of the intermediate voltage established by reference 31.

Without the control signal on output 23, section 56 would not respond to changes in the output voltage. Changing the value of the NL sense voltage causes section 56 to change the duty cycle of transistor 32 and correspondingly, the value of the intermediate voltage much faster than a pulse controller typically changes an output voltage, as quantified hereinbefore. Enabling transistor 40 changes the value of the NL sense voltage proportionally to the change in the value output voltage on output 28 in order to provide the rapid response.

If the change in the output voltage results in a decrease in the linear error signal, for example the output voltage increases, capacitor 59 forms a negative current flow or current spike that is coupled to the control electrode of transistor 40. This negative current spike has no effect on transistor 40 thereby resulting in no change in the intermediate voltage. However, the control voltage of transistor 46 is decreased causing a corresponding decrease in the output voltage.

Those skilled in the art will notice that turning-on transistor 40 effectively shorts out resistor 38 and couples node 30 to return 17. Those skilled in the art will also notice that an MOS transistor may be coupled across resistor 38 in order to modulate the effective resistance value by changing the gate voltage to the MOS transistor with the control voltage. In such an embodiment, transistor 40 and capacitor 59 would be omitted.

In order to assist in providing this functionality of control section 56, transistor 32 has a sense electrode connected to a first terminal of resistor 35 and to a positive input of amplifier 33. A second terminal of resistor 35 is connected to input 16. An inverting input of amplifier 33 is connected to the current reference output of reference 31, and the output of amplifier 33 typically is connected to an overcurrent control input of network 34. Transistor 32 also has a first current carrying electrode connected to input 16, a second current carrying electrode connected to a first terminal of inductor 41, and a control electrode connected to an output of network 34. Amplifier 36 has a positive input connected to the first output of reference 31, an inverting input connected to node 30, and an output connected to a voltage control input of network 34. A first terminal of resistor 37 is connected to output 18 and a second terminal is connected to both node 30 and a first terminal of resistor 38. A second terminal of resistor 38 is connected to return 17. Transistor 40 has a first current carrying electrode connected to node 30, a second current carrying electrode connected to return 17, and a control electrode connected to input 24. Diode 39 has a cathode connected to the first terminal of inductor 41 and an anode connected to return 17. Return 17 is also connected to return 19. Reference 31 has a voltage input connected to input 16.

Linear control section 57 has linear voltage input 21 connected to the first current carrying electrode of transistor 46. A second current carrying electrode of transistor 46 is connected to output 28, and a control electrode connected to both a first terminal of resistor 47 and to a first current carrying electrode of transistor 52. A second terminal of resistor 47 is connected to input 21. A second current carrying electrode of transistor 52 is connected to return 22, and a control electrode is connected to the output of amplifier 51 and to a first terminal of capacitor 53. An inverting input of amplifier 51 is connected to node 50 and to a second terminal of capacitor 53 while a positive input of amplifier 51 is connected to the output of reference 63. A voltage input of reference 63 is connected to input 21. A first terminal of resistor 48 is connected to output 28 and a second terminal is connected to node 50. A first terminal of resistor 49 is connected to node 50 and a second terminal is connected to return 22. Return 22 is also connected to power supply return 29. Capacitor 59 has a first terminal connected to the output of amplifier 51 and a second terminal connected to output 23. Output 23 is connected to input 24 of section 56. Input 21 is connected to output 18 of section 56, return 19 is connected to return 22, and return 22 is connected to return 29.

Figure 3:
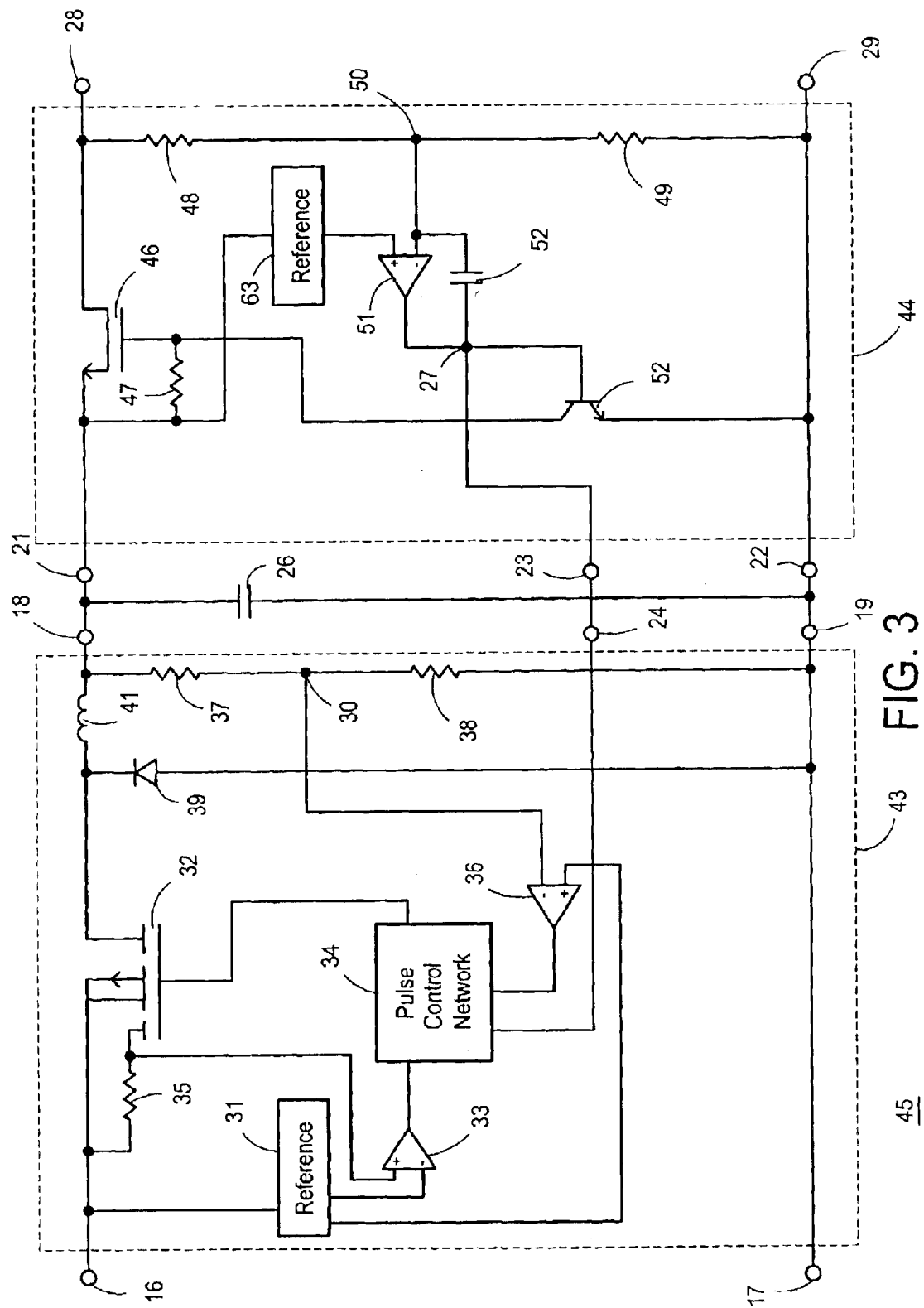
FIG. 3 schematically illustrates an alternate embodiment of the power supply controller of FIG. 2 in accordance with the present invention.

FIG. 3 schematically illustrates a power controller 45 that is an alternate embodiment of power controller 55 that was described in the description of FIG. 2. Controller 45 includes a non-linear control section 43 that is an alternate embodiment of section 56 and a linear control section 44 that is an alternate embodiment of section 57. Capacitor 59 and transistor 40 that are shown in FIG. 2 are removed. The output of amplifier 51 is used to drive output 23. Those skilled in the art will realize that a buffer transistor or other buffer device may be used between the output of amplifier 51 and output 23 to prevent loading the output of amplifier 51. Input 24 of section 43 is connected to a second input of network 34. When the output voltage decreases, controller 45 increases the intermediate voltage in response thereto. When the output voltage changes, the output of amplifier 51 also changes which results in a corresponding change at the second input to network 34. Network 34 receives the voltage level on input 24 and modifies the duty cycle of transistor 32 according to this voltage level to increase the intermediate voltage. Increasing the intermediate voltage in response to an increase in the output of amplifier 51 keeps the intermediate voltage increased until the output voltage recovers to the value established by reference 63 thereby improving the response time and the PSRR of controller 45.

Figure 4:
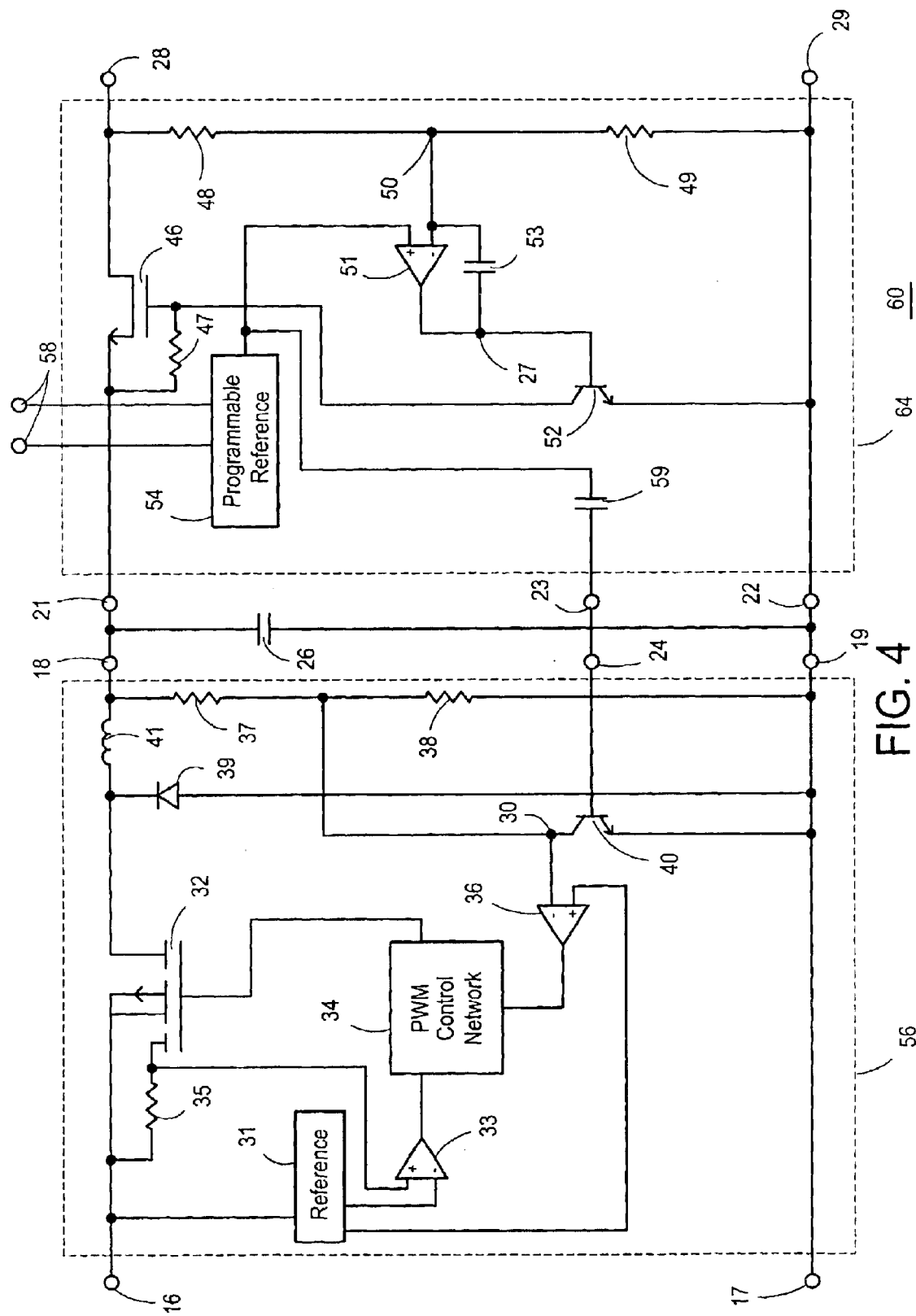
FIG. 4 schematically illustrates an alternate embodiment of a portion of a power supply controller in accordance with the present invention.

FIG. 4 schematically illustrates an embodiment of a portion of a power controller 60 that is an alternate embodiment of controller 55 described in the description of FIG. 2. Controller 60 includes non-linear control section 56 and a linear control section 64 that is an alternate embodiment of linear control section 57 explained in the description of FIG. 2. Section 64 includes a programmable reference 54 that is formed to generate the value of the reference voltage applied to the reference input of amplifier 51. The value of the reference voltage is established by the value of a control word applied to control inputs 58. The value of the control word represents a digital or analog value that determines the value of the reference voltage. Typically, the control word is generated by circuits external to controller 60. Such programmable references and the use of such in power supply systems is well known to those skilled in the art. Programmable reference 54 has an output connected to the positive input of amplifier 51 and to the first terminal of capacitor 59. When the value of the control word on inputs 58 changes, programmable reference 54 changes the value of the reference voltage applied to amplifier 51. The reference voltage is also applied to capacitor 59 and is connected through capacitor 59 to control output 23. Consequently, any change in the value of the reference voltage is rapidly coupled to output 23 and to section 56. The change in the value of the reference voltage forms a current spike through capacitor 59 to the control electrode of transistor 40. If the change in the reference voltage is results in an increase in the reference voltage, then a positive going current is generated through capacitor 59 resulting in a positive current to the control electrode of transistor to 40 thereby enabling transistor 40 to conduct current. Enabling transistor 40 reduces the value of the voltage at node 30 thereby causing an increase in the output of amplifier 36 resulting in increased duty cycle to drive transistor 32 and an increase in the intermediate output voltage. If the change in the reference voltage results in a decrease in the reference voltage, a corresponding negative current spike is formed through capacitor 59 and is applied to the control electrode of transistor 40. Such negative current spike has no effect on transistor 40 thereby resulting in no change in the intermediate output voltage. Those skilled in the art will recognize that the embodiment discussed in the description of FIG. 2 may also be combined with the embodiment discussed in the description of FIG. 4. For example, reference 54 may remain connected to amplifier 51, and capacitor 59 may be connected to the output of amplifier 51 instead of connected to the output of reference 54. Additionally, the embodiment discussed in the description of FIG. 3 may also be combined with the embodiment discussed in the description of FIG. 4. For example, capacitor 59 and transistor 40 may be replaced by gate 42 and the associated connections thereto.

Figure 5:
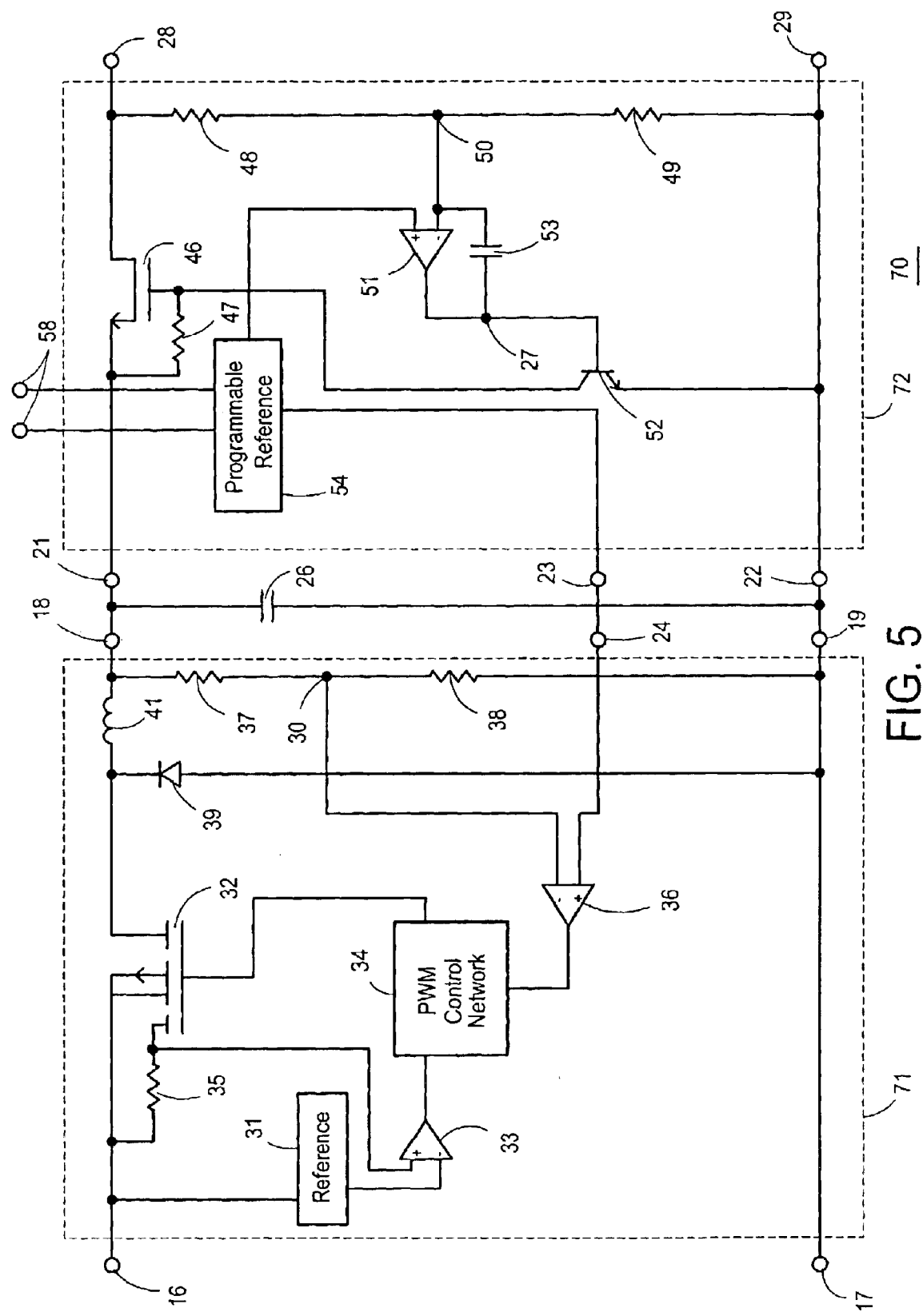
FIG. 5 schematically illustrates an alternate embodiment of the power supply controller of FIG. 4 in accordance with the present invention.

FIG. 5 schematically illustrates a power controller 70 that is an alternate embodiment of power controller 60 that was described in the description of FIG. 4. Controller 70 includes a non-linear control section 71 that is an alternate embodiment of section 56 and a linear control section 72 that is an alternate embodiment of section 64. Reference 54 is formed to have two programmable outputs that establish the value of the reference voltages for section 72 and also for section 71. One output of reference 54 is connected to amplifier 51 as discussed in the description of FIG. 4 and the value is selected to set the value of the output voltage. The other output of reference 54 is connected to output 23 and coupled by input 24 to the positive input of amplifier 36 and the value of this reference voltage is selected to set the intermediate voltage. When the value of the reference voltage is increased, the reference voltages of both sections 71 and 72 are increased. Thus, the intermediate voltage is increased in order to facilitate the increase in the output voltage. Increasing the intermediate voltage in response to an increase in the reference voltage improves the response time and the PSRR of controller 70.

Figure 6:
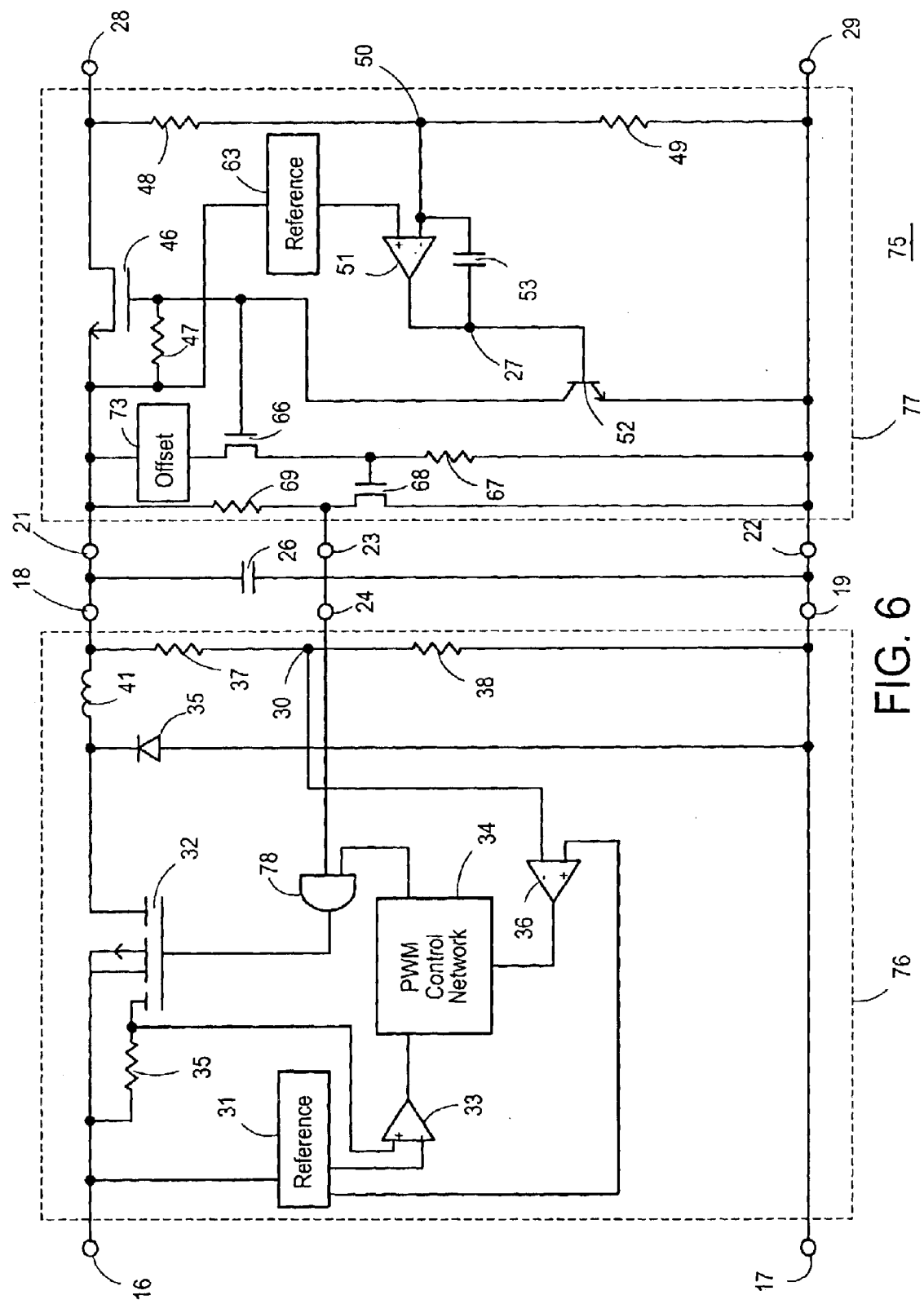
FIG. 6 schematically illustrates another alternate embodiment of a portion of a power supply controller in accordance with the present invention.

FIG. 6 schematically illustrates an embodiment of a portion of a power controller 75 that is another alternate embodiment of controller 55 described in the description of FIG. 2. Controller 75 includes a non-linear control section 76 that is another alternate embodiment of non-linear control section 56, and a linear control section 77 that is another alternate embodiment of linear control section 57 both of which were explained in the description of FIG. 2. Typically, it is desirable to operate transistor 46 in a linear region in order to provide a controlled on-resistance and a controlled PSRR. As the value of the output voltage decreases, transistor 46 may be driven harder to provide an increased output voltage value. If transistor 46 is driven too hard, it may begin operating in the saturation mode and reduce the PSRR. Typically, it is desirable to keep transistor 46 ten to twenty-five percent (10%–25%) below the saturation voltage. Controller 75 is formed to increase the value of the intermediate voltage in response to changes in the output voltage that result in transistor 46 operating close to the saturation region in order to provide the desired output voltage value without compromising the PSRR.

Section 77 includes a ratio transistor 66, an offset voltage circuit 73, a control signal transistor 68, a follower resistor 67, and a bias resistor 69. Section 76 includes an AND gate 78 that receives both the control signal from section 76 and the output of network 34, and responsively drives transistor 32.

Transistor 66 is formed to have a saturation voltage and size that are ratioed to the corresponding saturation voltage and size of transistor 46. Offset voltage circuit 73 is formed to provide an offset voltage that, in combination with the turn-on voltage of transistor 66, will activate transistor 66 when transistor 46 is near to saturation. In the preferred embodiment, offset voltage circuit 73 and transistor 66 ensure that the gate voltage of transistor 46 is less than about ten to twenty-five percent (10%–25%) less than the saturation voltage of transistor 46. Offset voltage circuit 73 typically is formed as a voltage reference with the offset voltage formed on an output of circuit 73 but circuit may be another circuit as long as the proper voltage is provided. When the drive voltage of transistor 46 decreases from the operating voltage or first voltage to the second voltage or the value of the offset voltage plus the turn-on voltage of transistor 66, transistor 66 is enabled to conduct current through resistor 67 and couple the offset voltage to the control electrode of transistor 68. Transistor 68 is enabled to conduct current through resistor 69 and couple output 23 to return 22 to generate the control signal on output 23. AND gate 78 receives the value of the control signal which drives the output of gate 78 low and enables transistor 32 at a one hundred percent (100%) duty cycle to increase the value of the intermediate voltage. Section 77 receives the increased intermediate voltage which is coupled to output 28 as a corresponding increase in the output voltage. As the output voltage increases, the linear sense voltage, and correspondingly the linear error signal, resulting in a decrease in the drive voltage applied to transistor 46. When the drive voltage is reduced below the value of the offset voltage, transistor 66 is disabled and the control electrode of transistor 68 is coupled to the voltage of return 22 through resistor 67. The return voltage disables transistor 68 and the control signal is coupled to the intermediate voltage through resistor 69. The control signal is received by gate 7B and the higher value enables gate 78 to respond to the output of network 34. Thus transistor 32 is controlled by the pulses provided by the output of network 34 and no longer has a one hundred percent (100%) duty cycle.

Controller 75 may have alternate embodiments as long as the gate voltage to transistor 46 is maintained below the saturation voltage, including increasing the intermediate voltage to assist in keeping transistor 46 from saturating. For example, section 77 may include a digital control circuit that detects transistor 46 nearing saturation and responsively changes the output voltage of reference 31 to increase the intermediate voltage thereby allowing the drive to transistor 46 to be decreased. The digital control circuit may have hysteresis that keeps the output of reference 31 increased until the drive to transistor 46 decreases to a value that is much less than the saturation voltage, for example more than twenty-five percent (25%) below the saturation voltage.

In order to facilitate this operation, transistor 66 has a first current carrying electrode connected to the output of circuit 73, a second current carrying electrode connected to a first terminal of resistor 67, and a control electrode connected to the control electrode of transistor 46. A second terminal of resistor 67 is connected to return 22. Transistor 68 has a first current carrying electrode connected to return 22, a second current carrying electrode connected to output 23 and to a first terminal of resistor 69, and a control electrode connected to the control electrode of transistor 46. A second terminal of resistor 69 is connected to input 21. Gate 78 has a first input connected to input 24, a second input connected to the output of network 34, and an output connected to the control electrode of transistor 32.

Figure 7:
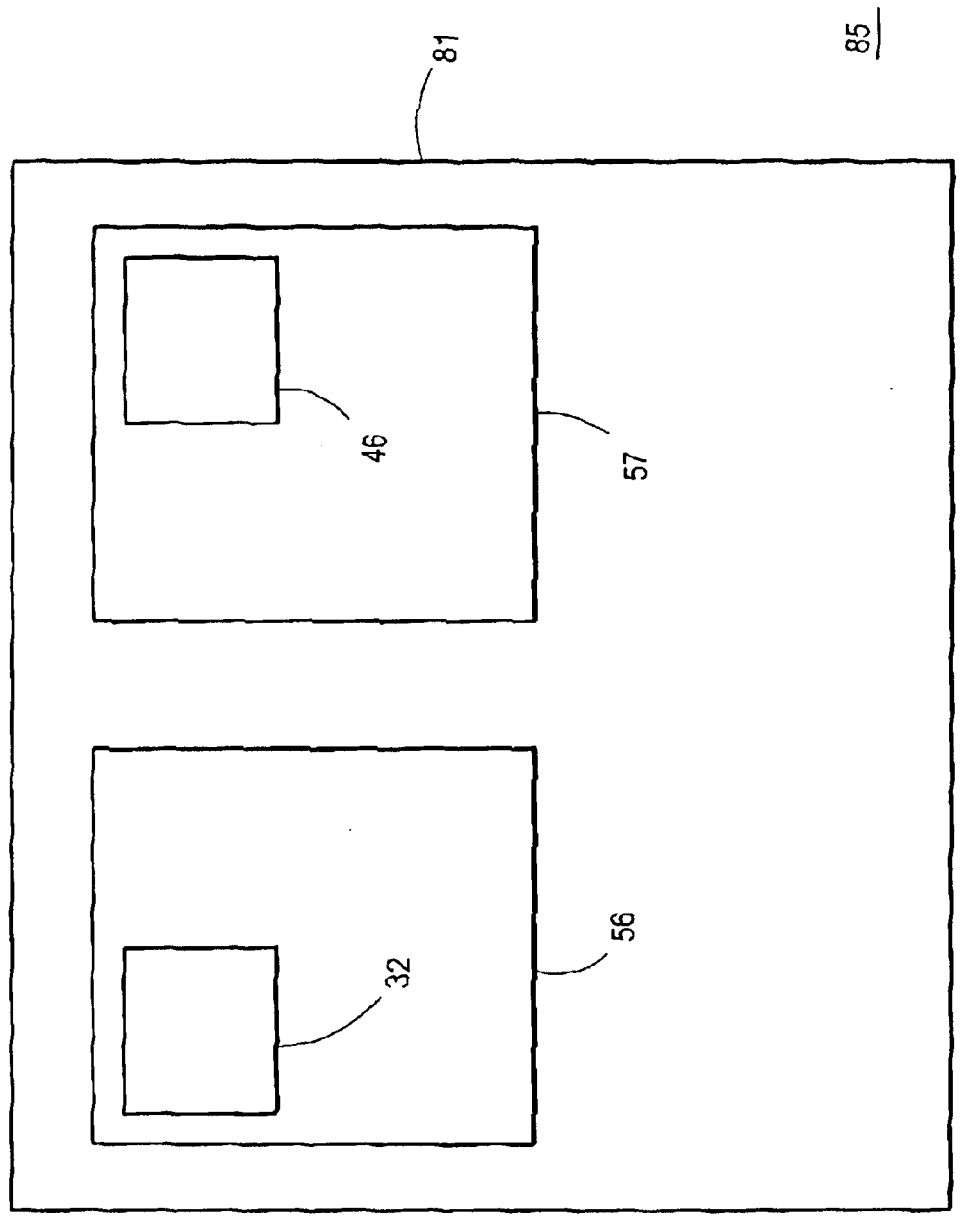
FIG. 7 schematically illustrates a plan view of an embodiment of a portion of a semiconductor device embodying a power supply controller in accordance with the present invention.

FIG. 7 schematically illustrates a plan view of an embodiment of a portion of a semiconductor device 85 embodying power supply controller 55 that is explained in the description of FIG. 2. Non-linear control section 56 and linear control section 57 are formed on a semiconductor die 81. Die 81 may also include other circuitry that is not shown in FIG. 5.

In view of all of the above, it is evident that a novel device and method is disclosed. Included, among other features, is coupling the output of a non-linear control section to the input of a linear section. Coupling the non-linear control section to change the value of the intermediate voltage in response to a control signal received from the linear control section assists in rapidly changing the intermediate voltage while maintaining a low voltage drop across the pass transistor of the linear control section and still maintaining a high PSRR. The configuration provides the unexpected advantage of rapidly responding to changes in the output voltage while maintaining a high PSRR and high accuracy. The configuration also provides high efficiency while having low noise.

What is claimed is:

1. A method of forming a power supply system comprising:

forming a non-linear control section cooperatively coupled to receive an input voltage and provide an intermediate output voltage on an output of the non-linear control section and to receive a sense signal that is representative of the value of the intermediate voltage;

forming a linear control section coupled to receive the intermediate output voltage and responsively provide a power supply output voltage; and forming the non-linear control section to change a value of the sense voltage of the non-linear control section responsively to the control signal from the linear control section and responsively change the intermediate output voltage responsively to the change in the sense signal.

2. The method of claim 1 wherein forming the non-linear control section to change the value of the sense voltage includes forming the non-linear control section to increase the value of the intermediate output voltage in response to a change in a value of a reference voltage of the linear control section.

3. The method of claim 1 wherein forming the non-linear control section to change the value of the sense voltage of the non-linear control section includes coupling a capacitor to receive an output of an error amplifier of the linear control section and to responsively form the control signal, and further including coupling a transistor of the non-linear control section to receive the control signal and change a value of a resistor divider of the non-linear control section.

4. The method of claim 1 wherein forming the non-linear control section to change the value of the sense voltage includes forming the linear control section to provide the control signal when a value of a gate voltage of a pass transistor of the linear control section decreases from a first voltage value to a second voltage value.

5. The method of claim 4 wherein forming the linear control section to provide the control signal when the value of the gate voltage of the pass transistor of the linear control section decreases from the first voltage value to the second voltage value includes forming a ratio transistor that is ratioed to the pass transistor and coupled to provide the control signal when the gate voltage of the pass transistor decreases from the first voltage value to the second voltage value.

6. A method of forming a power supply system comprising:

forming a non-linear control section cooperatively coupled to receive an input voltage and provide an intermediate output voltage on an output of the non-linear control section;

forming a linear control section coupled to receive the intermediate output voltage and responsively provide a power supply output voltage; and forming the non-linear control section to increase the value of the intermediate output voltage in response to a change in the value of a reference voltage of the linear control section including coupling a capacitor to receive the value of the reference voltage of the linear control section and responsively form a control signal, and further including forming the non-linear control section to receive the control signal and responsively change a value of a sense voltage applied to an error amplifier of the non-linear control section.

7. The method of claim 6 wherein forming the non-linear control section to increase the value of the intermediate output voltage includes forming the transistor of the non-linear control section responsively to the control signal.

8. The method of claim 6 wherein forming the non-linear control section to increase the value of the intermediate output voltage includes forming the non-linear control section to increase the value of the intermediate output voltage in response to a decrease in a value of the power supply output voltage.

9. The method of claim 6 wherein forming the non-linear control section to increase the value of the intermediate output voltage in response to the change in the value of the reference voltage of the linear control section includes forming the linear control section to change a value of a reference voltage applied to an error amplifier of the non-linear control section in response to the change in the value of the reference voltage of the linear control section.

10. A method of forming a power supply system comprising:
    forming a non-linear control section cooperatively coupled to receive an input voltage and provide an intermediate output voltage on an output of the non-linear control section;
    forming a linear control section coupled to receive the intermediate output voltage and responsively provide a Power supply output voltage including forming the linear control section to provide a control signal when a value of a gate voltage of a pass transistor of the linear control section decreases from a value greater than twenty five percent greater than the gate voltage to a value equal to or less than twenty five percent greater than the gate voltage; and
    forming the non-linear control section to change a value of the intermediate output voltage responsively to the control signal from the linear control section.

11. The method of claim 10 further including forming the linear control section and the non-linear control section on a semiconductor die.

12. A method of forming a power supply system comprising:
    generating an intermediate output voltage on an output of a non-linear control section and receiving a sense signal having a value representative of the intermediate voltage;
    receiving the intermediate output voltage on an input of a linear control section and responsively generating an output voltage on an output of the linear control section;
    generating a control signal on a control output of the linear control section; and
    receiving the control signal on a control input of the non-linear control section and responsively changing the value of the sense signal responsively to the control signal.

13. The method of claim 12 wherein generating the control signal on the control output of the linear control section includes generating the control signal responsively to changes in a value of a reference voltage of the linear control section.

14. The method of claim 13 wherein generating the control signal responsively to changes in the value of the reference voltage of the linear control section includes changing the value of the sense signal of the non-linear control section.

15. The method of claim 12 wherein responsively generating the control signal on the control output of the linear control section includes generating the control signal responsively to a value of a gate voltage of a pass transistor of the linear control section decreasing from a first value to a second value.

16. A method of forming a power supply system comprising:
    generating an intermediate output voltage on an output of a non-linear control section;
    receiving the intermediate output voltage on an input of a linear control section and responsively generating an output voltage on an output of the linear control section;
    generating a control signal on a control output of the linear control section responsively to changes in a value of a reference voltage of the linear control section; and
    generating a negative current flow that is received on a control input of the non-linear control section and responsively changing a value of a sense voltage of the non-linear control section.

17. The method of claim 16 wherein generating the control signal responsively to changes in the value of the reference voltage of the linear control section includes changing a value of a reference voltage applied to an error amplifier of the non-linear control section.

* * * * *